United States Patent [19]
Skelly

[11] Patent Number: 6,064,383
[45] Date of Patent: *May 16, 2000

[54] METHOD AND SYSTEM FOR SELECTING AN EMOTIONAL APPEARANCE AND PROSODY FOR A GRAPHICAL CHARACTER

[75] Inventor: Timothy C. Skelly, Redmond, Wash.

[73] Assignee: Microsoft Corporation, Remond, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/725,490

[22] Filed: Oct. 4, 1996

[51] Int. Cl.$^7$ ........................................... G06F 3/14
[52] U.S. Cl. ........................... 345/339; 345/145; 345/331
[58] Field of Search ..................... 345/326, 339, 345/329, 331, 333, 334, 145, 434; 463/31, 32, 33

[56] References Cited

U.S. PATENT DOCUMENTS

| | | | |
|---|---|---|---|
| 5,367,454 | 11/1994 | Kawamoto et al. | 345/326 |
| 5,649,086 | 7/1997 | Belfer et al. | 345/441 |
| 5,676,138 | 10/1997 | Zawilinski | 600/301 |
| 5,682,469 | 10/1997 | Linnett et al. | 345/473 |
| 5,701,424 | 12/1997 | Atkinson | 345/353 |
| 5,732,232 | 3/1998 | Brush, II et al. | 345/339 |

OTHER PUBLICATIONS

Rollo, Carl C., "Pie Menu for Example—Options," Pie Menu for Windows (1995)—p. 1; A Brief Description of Pie Menus for Windows (1995)—pp. 1 and 2; Pie Menus Sample Screen (1996)—p. 1; Pie Menus Sample Screen (1996)—p. 1.

U.S. application No. 08/612,560, Kurlander, filed Mar. 8, 1996.

*Primary Examiner*—Raymond J. Bayerl
*Assistant Examiner*—Cao H. Nguyen
*Attorney, Agent, or Firm*—Christensen O'Connor Johnson & Kindness PLLC

[57] ABSTRACT

A user interface element enables the user to select an appearance for a character that corresponds with an emotion and an emotional intensity. The user interface may more generally be utilized to select values for a first degree of freedom and a second degree of freedom. The user interface element may take the form of a symmetrical closed curve, such as a circle. The user interface element is logically partitioned into sub-regions. Each sub-region may additionally be partitioned into one or more sub-areas. Each sub-region is associated with a given value for a first degree of freedom, and each sub-area is associated with a value for the second degree of freedom. When the user interface element is utilized to select emotions and emotional intensity for a character, the user interface element may include a character preview area that displays a preview of a character's appearance given a current position of the position indicator within the user interface element.

42 Claims, 7 Drawing Sheets

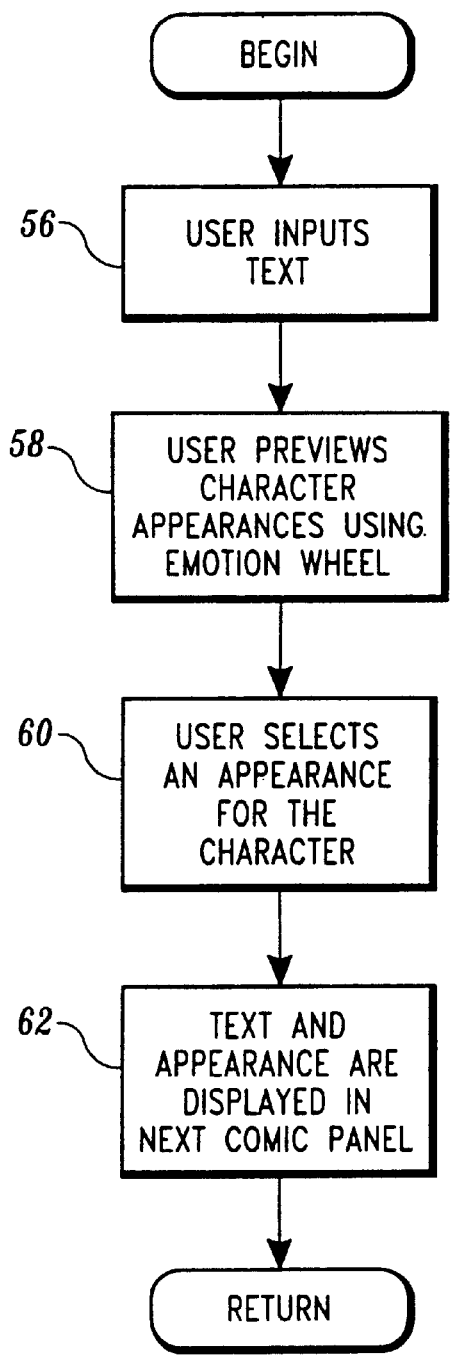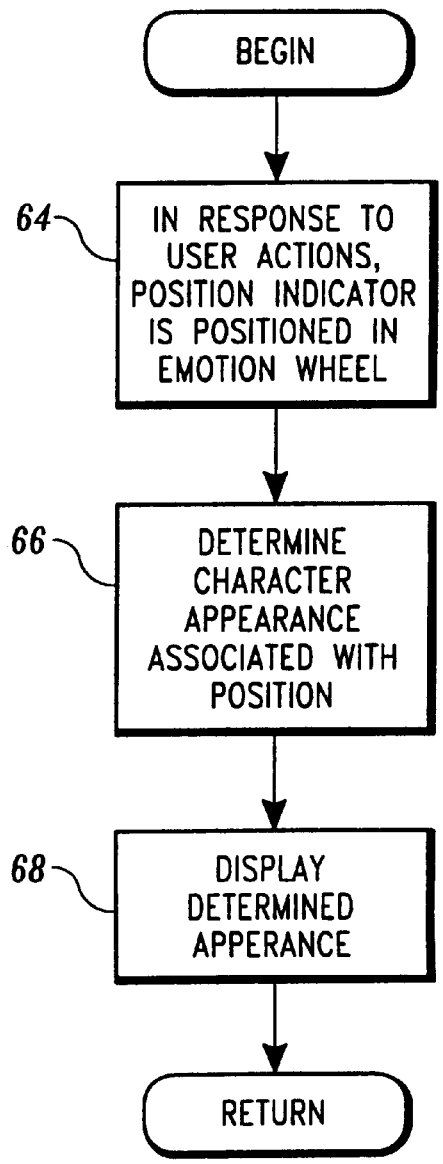
Fig. 4.
Fig. 5.

METHOD AND SYSTEM FOR SELECTING AN EMOTIONAL APPEARANCE AND PROSODY FOR A GRAPHICAL CHARACTER

TECHNICAL FIELD

The present invention relates generally to computer systems and, more particularly, to a user interface that enables the user to select a character appearance that corresponds with an emotional intensity.

BACKGROUND OF THE INVENTION

U.S. patent application Ser. No. 08/612,560, entitled "METHOD AND SYSTEM FOR GENERATING COMIC PANELS," which was filed on Mar. 8, 1996, and which is assigned to a common assignee with the present application, describes a system for generating comic panels. FIG. 1 shows an example of comic panel 10 that is generated by the system. The comic panel 10 includes characters, such as character 18, and speech balloons 12. Each speech balloon holds text 14 for an associated character. The speech balloons 12 include pointing portions 16 that help a viewer to associate the speech balloons with their characters. The system determines where to position each character and where to position the speech balloons relative to the characters. In determining where to position the character, the system determines what direction the character should face and also determines the background for the comic panel. The text of the speech balloon is provided by a user of the comic generation system.

The comic generation system is well suited for use in a comic chat environment, where users on different computers interactively input text to communicate with each other. In this environment, each user has an associated character and communicates with other users by manipulating the appearance of the character and by providing text that is displayed within the speech balloons for the character. Such a comic chat environment is an alternative to a conventional chat session environment in which users simply input text to be a keyboard, and the text from all the participating members of the chat session is visible to all participants.

The system provides a user with a number of different character choices. When a user enters a chat session, the user must select from amongst those character choices. The system maintains a set of bitmaps for each of the characters to reflect different gestures and expressions. The system automatically selects gestures and expressions for a character based on the input text. The system searches the input text for emoticons, which are a series of characters that represent emotions. An example of an emoticon is ":-)", which indicates being happy and ":-(", which indicates being sad. The system maintains a list of emoticons, along with associated gestures and expressions. Upon finding an emoticon, the system modifies the expression (i.e., assigns a bitmap for display for the character that captures the expression) of the character to indicate happiness or sadness, respectively.

The system also searches the input text to identity acronyms that may provide clues as to the desired appearance for the character (i.e., the desired gesture and expression). For example, the acronym LOL is short for "laughing out loud." Upon finding LOL in the text, the system concludes that the character should be laughing and generates a laughing appearance for the character.

The system processes the text to look for text that is capitalized. Such capitalized text is viewed as an indication that a user intends for the character to be shouting. Accordingly, the system generates appearance for the character where the character is shouting when encountering such capitalized text.

When the system finds multiple indicators of gestures and expressions, the system attempts to draw each of the found gestures and expressions. There may be instances, however, where there is a conflict and the system employs a priority scheme to determine which expression and gesture should be assigned to the character.

One limitation of this system is that it is difficult for a user to convey irony or sarcasm. Moreover, it is often difficult for a user to convey a desired intensity of emotion. A character may have a single happy appearance and, thus, it may be difficult for a character to convey different degrees of happiness.

SUMMARY OF THE INVENTION

In accordance with a first aspect of the present invention, a user interface component that is logically partitioned into sub-regions is displayed on a display device. Each sub-region is associated with a value for a first degree of freedom relative to output to be generated. Each sub-region is further divisible into one or more sub-areas, and each sub-area is associated with a value for second degree of freedom relative to the output that is to be generated. The user positions the position indicator within a selected one of the sub-areas of a selected one of the sub-regions. As a result, the value associated with the selected sub-region is assigned for the first degree of freedom and the value associated with the selected sub-area is assigned for the second degree of freedom. Output is generated on the output device corresponding with the assigned values.

In accordance with another aspect of the present invention, a user interface element presents a user with a selection of possible emotions and intensities of emotions for a character that is assigned to the user. The current position of a position indicator is manipulated within the user interface element to a new position in response to the user using the input device. The new position is associated with a choice of a selected emotion and a selected intensity of the selected emotion. The character is displayed on the display device with an appearance that reflects the selected emotion and the selected intensity of the selected emotion.

In accordance with an additional aspect of the present invention, a graphical element that is logically partitioned into sub-regions is displayed on a video display. Each sub-region is divisible into at least one sub-area. Each sub-region is associated with an emotion, and each sub-area is associated with an intensity level for an emotion. The cursor is positioned to point to a location within the graphical element in response to the user using a mouse. It is then determined what sub-region and what sub-area the location to which the cursor points lies within. An appearance is assigned to a graphical character that represents a user in a chat session, such that the appearance reflects the emotion associated with the sub-region in which the location in which the cursor points lies within and that reflects the emotional intensity associated with the sub-area in which the location to which the cursor points lies within.

In accordance with the further aspect of the present invention, the user interface element enables the user to select an emotion for a graphical character and intensity of the emotion to be reflected in the appearance of the character by using an input device. When the user uses the input device on a first occasion, the user is shown a first preview that shows the appearance of the character that reflects the first choice of emotion and intensity of emotion. When the user again uses the input device relative to the user interface element, the user is displayed a second preview that shows the second appearance of the character that reflects the second choice of emotion and intensity of emotion. One of the previewed appearances is then assigned to the character in response to a user choice.

BRIEF DESCRIPTION OF THE DRAWINGS

A preferred embodiment to the present invention will be described in more detail below relative to the following figures.

FIG. 4 is a flowchart that illustrates the steps that a user performs to participate in a comic chat session using the first embodiment of the present invention.

FIG. 5 is a flowchart illustrating the steps that are performed for a user to select a given appearance for the graphical character.

DETAILED DESCRIPTION OF THE INVENTION

The preferred embodiment of the present invention provides a user interface mechanism for a user to select an appearance for a character that is associated with a given emotion and emotional intensity. The preferred embodiment will be described below relative to its implementation in a comic chat environment, such as that described in the Background of the Invention. The user interface element allows a user to select a given emotion (i.e., an appearance of a character that conveys a particular emotion) and an intensity of the emotion. The user interface mechanism is easy for users to understand and provides a user with the ability to preview the appearance of the character before they select the appearance for the character. This user interface element enables a user to convey nuanced, image-influenced verbal attitudes, such as sarcasm and irony and enables a user to select an appearance for a character that conveys the appropriate level of emotional intensity.

Figure 1:
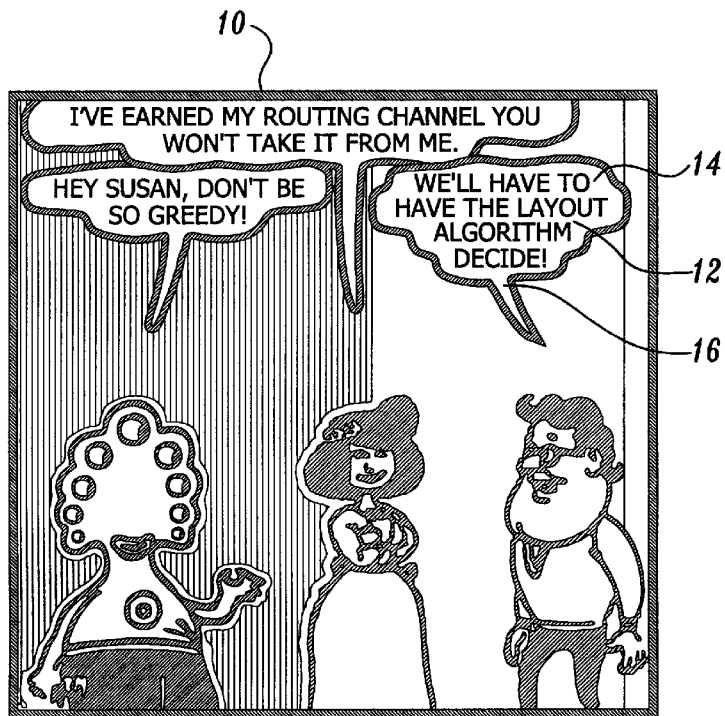
FIG. 1 depicts an example comic panel generated with a conventional system for generating comic panels.
Figure 2:
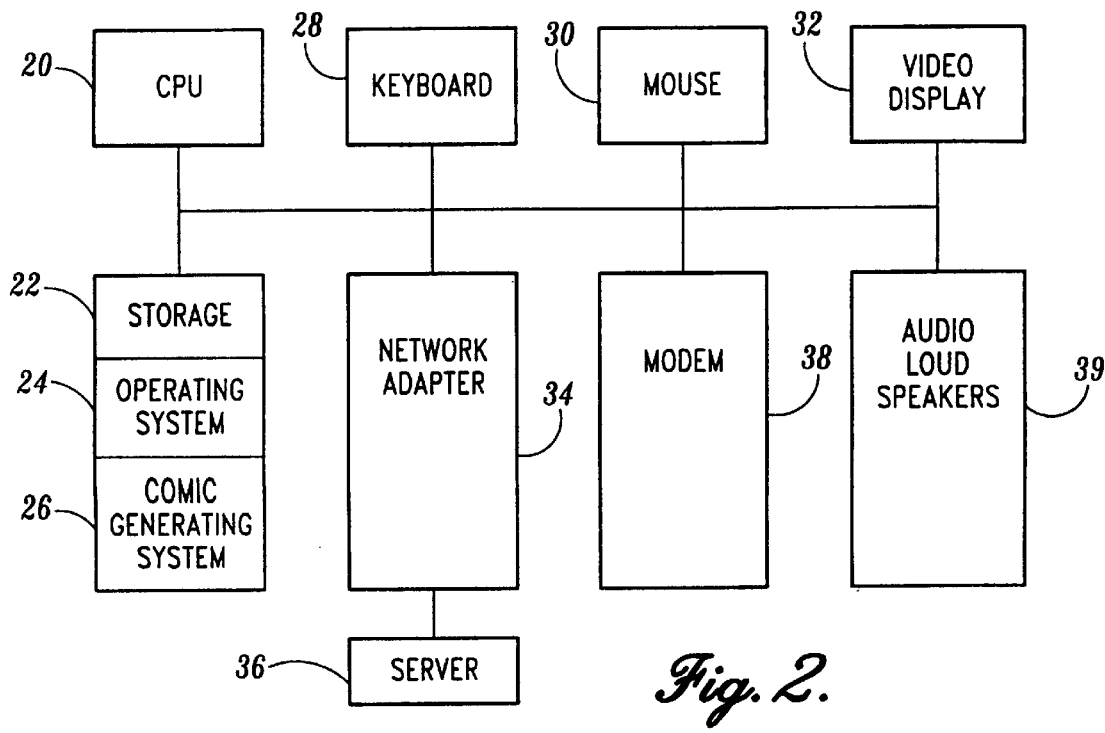
FIG. 2 is a block diagram of a computer system that is suitable for practicing the preferred embodiment of the present invention.

FIG. 2 is a block diagram of a computer system that is suitable for practicing the preferred embodiment of the present invention. The system includes a central processing unit (CPU) 20 and a storage 22 (such as primary memory or secondary memory) to hold a copy of an operating system 24 and a comic generating system 26. In the preferred embodiment of the present invention, the comic generating system 26 is an embellished version of the system that is described within the Background of the Invention of the present application. The comic generating system 26 includes support for generating comic panels and comic chat sessions.

The computer system environment also includes a keyboard 28, a mouse 30 and a video display 32. A network adapter 34 is provided to interface the CPU 20 with a server 36. The server 36 may provide support for comic chat sessions. A modem 38 may also be provided to facilitate communications over a telephone line with remote computing resources. Audio loud speakers 39 are provided for generating audio output.

Figure 3A:
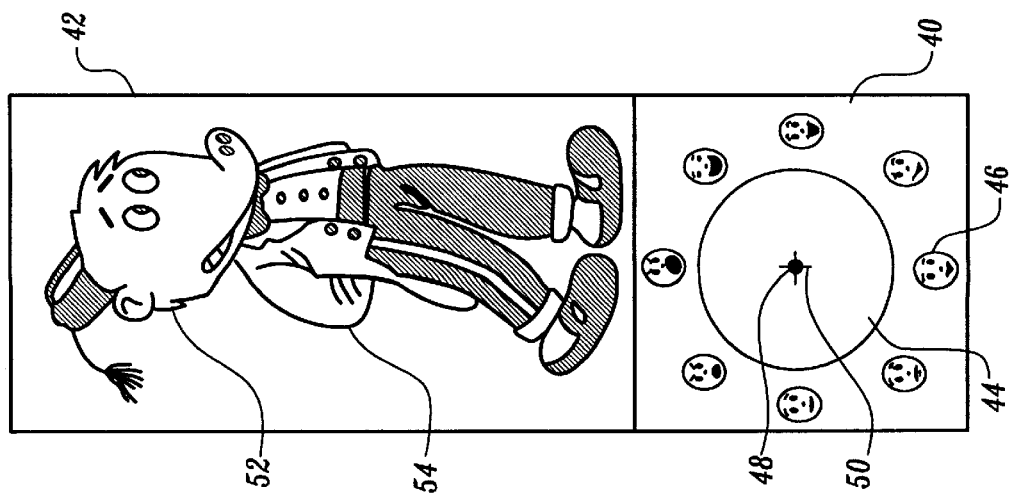
FIGS. 3A, 3B and 3C illustrate an example of the operation of the emotion wheel in accordance with a first embodiment of the present invention.

FIG. 3A shows the first embodiment of the user interface mechanism that is provided to enable a user to select a given emotion and a given intensity for a character. The user interface mechanism includes an emotion wheel 40 and a character preview area 42. The emotion wheel includes an inner circular area 44 that is surrounded by icons 46 for associated emotions. Those skilled in the art will appreciate that text or non-iconic images may be used in place of the icons 46. A position indicator 48 indicates a current position within the circular region 44 of the emotion wheel 40. Cross hairs 50 are shown to identify the center of the circular region 44. Those skilled in the art will appreciate that the position indicator 48 may take the form other than a dot (e.g., a pointer) and that the cross hairs 50 that identify the center point are not required elements for practicing the present invention. The character preview area 42 provides a preview of the appearance of the character. In particular, the character preview area 42 displays the head 52 and body 54 of the character in accordance with the currently selected emotion and intensity that correspond with the current position of the position indicator 48 within the circular region 44 of the emotion wheel 40.

A user selects an emotion and intensity for a character by using an input device, such as the mouse 30, to manipulate the position indicator 48. It is the position of the position indicator 48 that determines the emotion and intensity for the character and, thus, the appearance of the character. FIG. 3A shows the position indicator 48 at the default location in the center of the circular area 44 that is identified by the cross hairs 50. This is a neutral location. Accordingly, the head 52 and body 54 of the character shown in the character preview area 42 convey a neutral emotional state. Those skilled in the art will appreciate the default location need not be located at the center of the emotion wheel circular area 44 but, rather, could be located at a different default location. Moreover, different characters can have different default locations. Still further, a user may choose the default location for the character rather than the system.

Figure 3B:
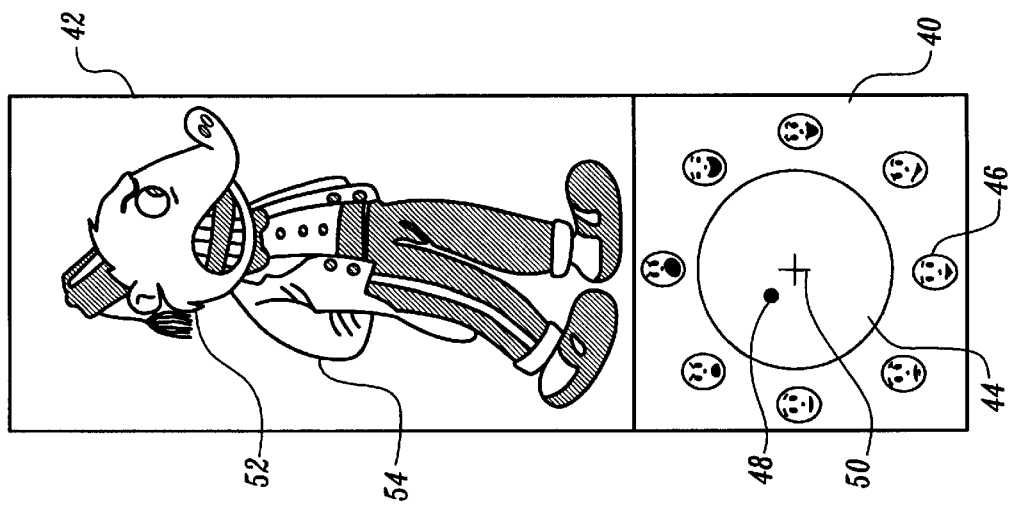
Figure 3C:
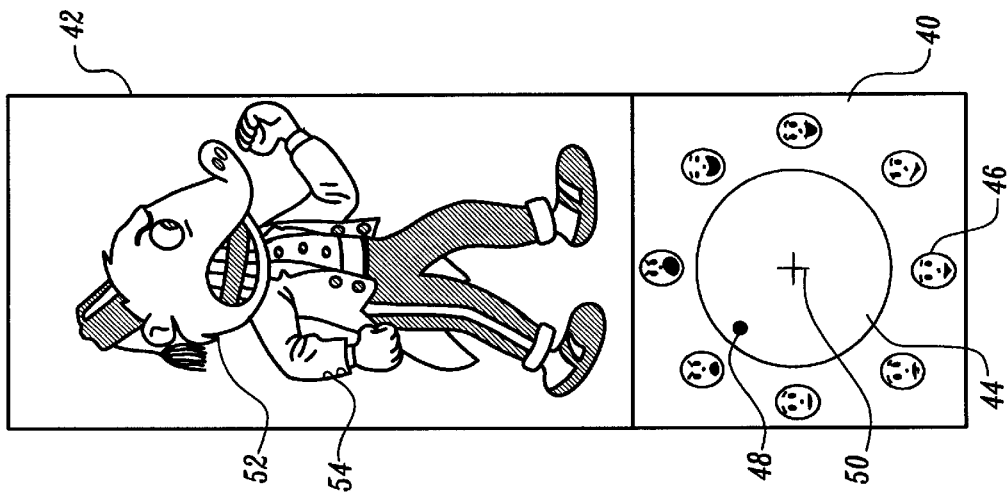
Figure 6:
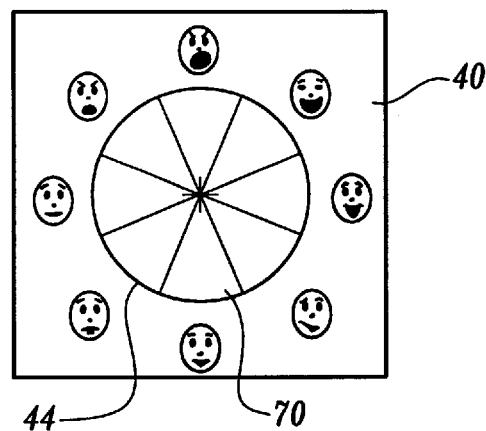
FIG. 6 is a diagram that illustrates the logical partition of the emotion wheel.

As the user moves the position indicator radially outward toward the outer periphery of the circular area 44, the intensity of the selected emotion increases. As such, the appearance of the character displayed within the character preview area 42 changes to indicate greater intensity. FIGS. 3B and 3C indicate the changing appearance of the character as the position indicator 48 is moved radially outward in the region associated with anger. In FIG. 3B, the head 52 of the character has changed to indicate mild anger. The appearance of the body 54 of the character has not changed between FIGS. 3A and FIG. 3B. However, as the position indicator 48 is moved further radially outward, as shown in FIG. 3C, the appearance of the body 54 of the character changes to indicate a greater level of anger.

As mentioned above, in the preferred embodiment of the present invention, the emotion wheel 40 and character preview area 42 are integrated into a comic chat application that remains displayed in the user's workstation to allow a user to select the appearance of the character in the next comic panel. FIG. 4 is a flowchart that illustrates the steps that are performed to use the emotion wheel 40 in such a comic chat environment. Initially, the user inputs the text that the user wishes to appear in the speech balloon for the next generated comic panel (step 56 in FIG. 4). The user then previews the character appearances using the emotion wheel 40 (step 58 in FIG. 4). The user does this by performing the steps depicted in the flowchart of FIG. 5. First, the user manipulates the position indicator 48 (step 64 in FIG. 5). The position indicator 48 starts off at the default location. For example, a user may start off with the emotion wheel like that depicted in FIG. 3A and then move the position indicator 48 to the position shown in FIG. 3B. The system automatically determines the appearance associated with the position indicator position (as will be described in more detail below) (step 66 in FIG. 5). The associated appearance is displayed within the character preview area 42 (step 68 in FIG. 5). Suppose that the user determines that the appearance of the character in FIG. 3B is not angry enough. The user then pushes the position indicator 48 further radially outward to the position depicted in FIG. 3C. The appearance of the character within the character preview area 42 changes accordingly. The user then selects the desired appearance for the character (step 60 in FIG. 4). The system utilizes the text and appearance to display the character with the appearance and with the speech balloon that includes the text in the next generated comic panel, as described in U.S. patent application Ser. No. 08/612,560 (step 62 in FIG. 4).

As mentioned above, the system associates each position of the position indicator 48 within the circular region 44 of the emotion wheel 40 with an appearance. In the first embodiment of the present invention, the system logically partitions the circular region 44 of the emotion wheel 40 into eight equally-sized pie-shaped slices or sub-regions 70. Each pie-shaped sub-region 70 is associated with a particular emotion. When the position indicator 48 lies within a sub-region associated with a given emotion, an appearance conveying that associated emotion is displayed within the character display area 42. The system must not only associate these regions with emotions, but it must associate sub-areas of each of these sub-regions with intensities of emotions. In this first embodiment, each sub-region 70 may be sub-divided into one or more radially-separated sub-areas.

Figures 7A, 7B:
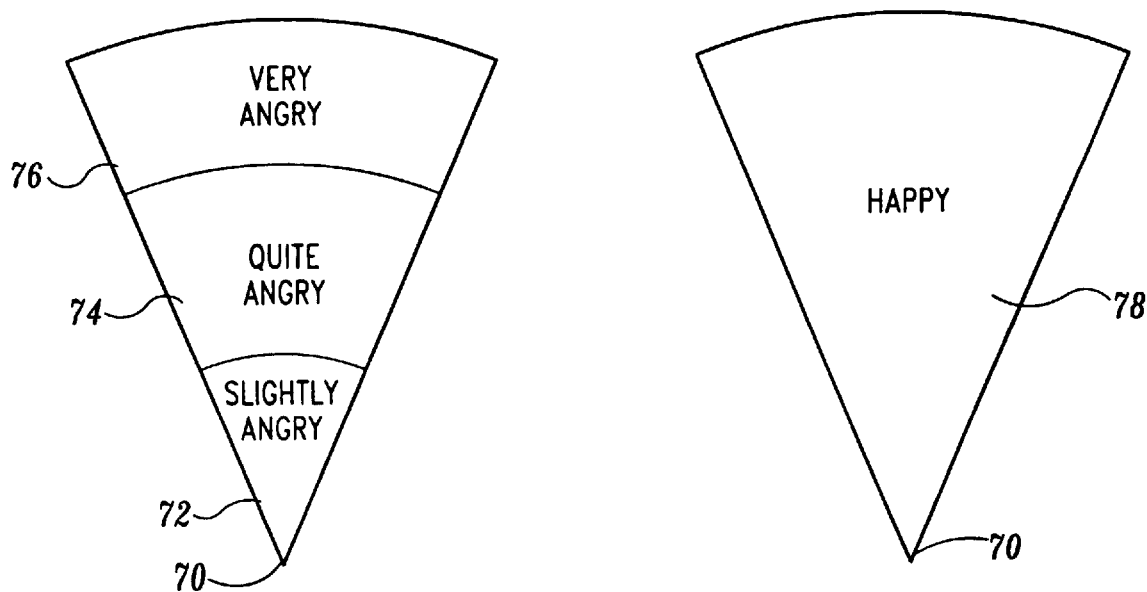
FIGS. 7A and 7B depict exemplary sub-divisions of sub-regions into sub-areas of different intensity levels.

FIG. 7A depicts an example wherein the sub-region 70 is associated with the emotion of anger and is sub-divided into three sub-areas 72, 74 and 76. The inner sub-area 72 is associated with a "slightly angry" emotional state, whereas the middle sub-area 74 is associated with a "quite angry" emotional state. The outer sub-area 76 is associated with a "very angry" emotional state. FIG. 7B shows an instance wherein the entire sub-region 70 is dedicated to only one emotional intensity. Thus, the entire slice 70 has a single sub-area 78 that is associated with a happy emotional state.

Figure 8A:
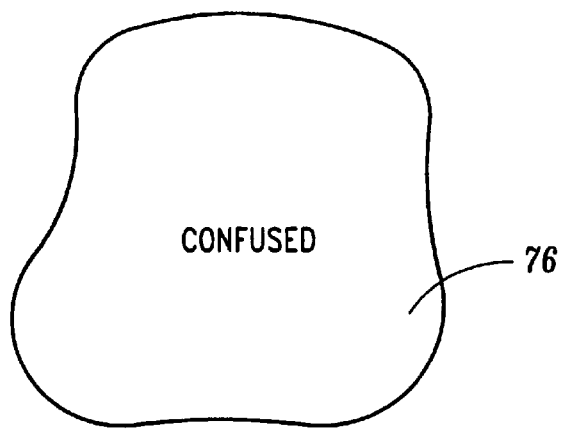
FIG. 8A depicts an alternative embodiment in which a asymmetrical closed curved region is used for a sub-region instead of a pie slice-shaped region.
Figure 8B:
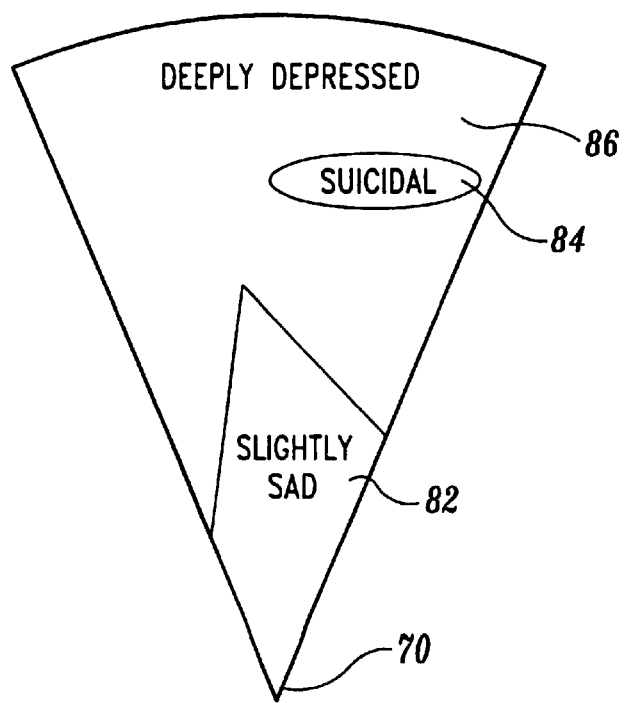
FIG. 8B shows an example of the division of a sub-region into irregularly-shaped and unequal-sized sub-areas.

Those skilled in the art will appreciate that in alternative embodiments, the sub-regions need not be slice-shaped but, rather, may take alternative shapes. FIG. 8A shows an example of such an alternative shape for a sub-region 80 for an associated emotion. FIG. 8B shows an example of alternatives of sub-dividings for the sub-areas such that the sub-areas are not strictly radially divided. In the example shown in FIG. 8B, the sub-region 70 includes irregularly shaped sub-areas 82, 84 and 86.

Figure 9:
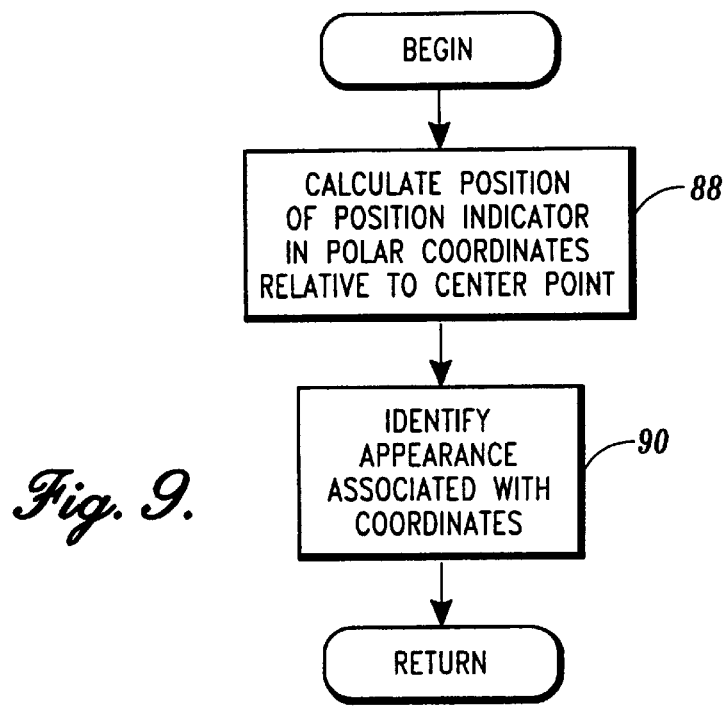
FIG. 9 is a flowchart illustrating the steps that are performed in the first embodiment of the present invention to determine the appearance of a character relative to a current position of the position indicator.

In the first embodiment, when the system needs to know what appearance of the character is to be displayed in the character display area 42, the system performs the steps depicted in FIG. 9. Specifically, the system calculates the position of the position indicator in polar coordinates relative to the center of the circular area 44 of the emotion wheel 40 (step 88 in FIG. 9). By calculating the position of the position indicator in polar coordinates, the system is given an angular value and a radial value. The angular value specifies the angle of the current position indicator relative to the center of the circle, and the radial value specifies the radial distance to the current position of the position indicator along the specified angle. These polar coordinates may be used to specify where the position indicator position falls within a given sub-region. This allows the system to determine the sub-region into which the position indicator falls.

Figure 10:
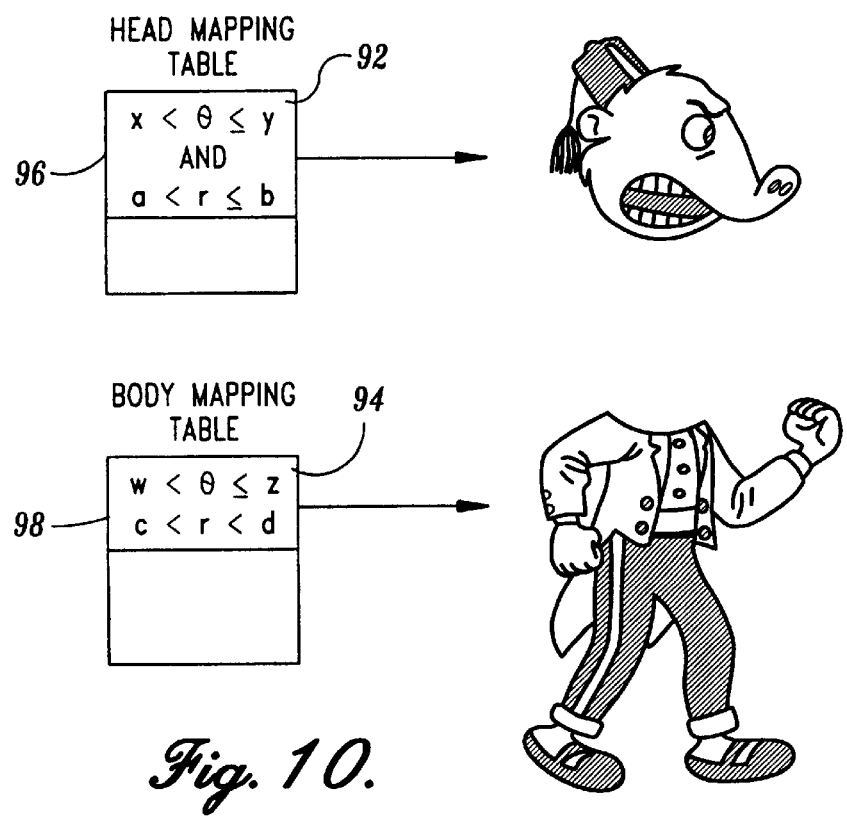
FIG. 10 is a diagram illustrating the use of mapping tables to map coordinates of a position indicator to bitmaps for a character.

The system uses the polar coordinates to identify the appearance that is associated with the coordinates (step 90 in FIG. 9). The system maintains a mapping table or other structure that maps each of the possible positions of the position indicator within the circular region to character appearances. In the first embodiment, the system maintains a mapping table to map the polar coordinates to a bitmap that specifies the appearance at the head of the character and a separate mapping table to map to a bitmap that specifies the body appearance of the character. FIG. 10 shows an example of how such mapping tables are utilized. The system maintains a head mapping table 92 and a body mapping table 94. Entries in both of the tables 92 and 94 are indexed by polar coordinates. An entry is provided in the head mapping table 92 or each sub-area within the sub-region 70. In FIG. 10, entry 96 is associated with a given range of angle values and radial values. Specifically, the entry 96 is associated with instances where the angle, θ, is greater than x and less than or equal to y, and the radial value is greater than a and less than or equal to b. This entry 96 maps to a bitmap for the characters head. The body mapping table 94 maps the polar coordinates to a bitmap for the characters body. In the example depicted in FIG. 10, entry 98 in the body mapping table 94 is associated with a different sub-area in the sub-region than entry 96. This is illustrated to highlight that separate mappings may be provided for different portions of the character, including the characters head, body, extremities, etc. Alternatively, there may be a single mapping table that maps to a bitmap for the appearance of the entire character. Those skilled in the art will appreciate that the mappings need not be to bitmaps but may be to metafiles or other representations for the appearance of the characters.

Figure 11:
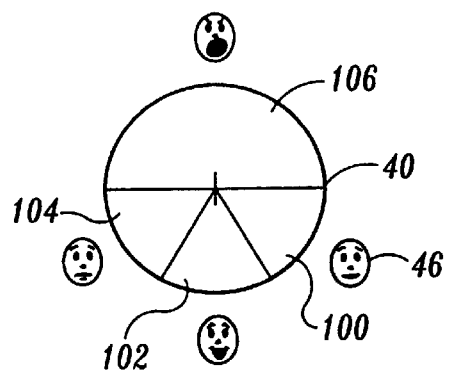
FIG. 11 depicts an alternative embodiment in which sub-regions are of unequal sizes.

It should be appreciated that the sub-regions dedicated to particular emotions need not be equal sized for all of the emotions. FIG. 11 depicts an alternative embodiment of the emotion wheel 40 wherein the size of the sub-regions differs. Sub-regions 100, 102 and 104 are like-sized, but sub-region 106 is substantially greater in size. This type configuration may be utilized where a particular emotion occurs frequently or a character exhibits a particularly large number of varying intensities for a given emotion.

Figure 12:
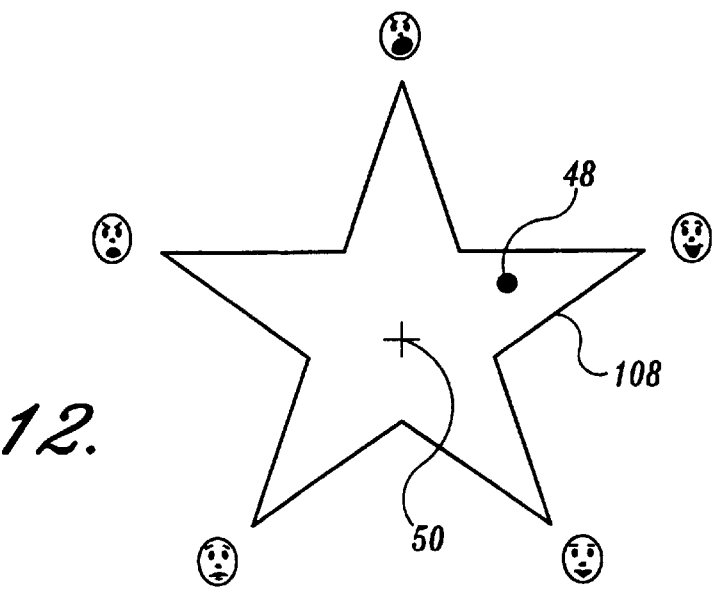
FIG. 12 depicts an alternative embodiment in which a star-shaped region is used rather than a circular region.

It should also be appreciated that the user interface mechanism need not be an emotion wheel. FIG. 12 depicts an example of an emotion star where the region in which the position indicator 48 may move is star shaped. Those skilled in the art will appreciate that a large number of other types of shapes and configurations may be utilized for the user interface mechanism. The shape may be chosen to suit the esthetics of the application or the varying needs of the application.

In general terms, the present invention encompasses user interface elements that are graphical in nature and enable a user to choose values for two degrees of freedom. With a circular user interface element, the angular displacement of the position indicator identifies a value for a first degree of freedom and the radial displacement of the position of the position indicator identifies a value for a second degree of freedom. In the first embodiment described above, the first degree of freedom corresponds with choice of emotion and the second degree of freedom corresponds with emotional intensity. Nevertheless, those skilled in the art will appreciate that the user interface element of the present invention is more generalized than used solely for selection of emotions and emotional intensities for graphical characters.

Figure 13:
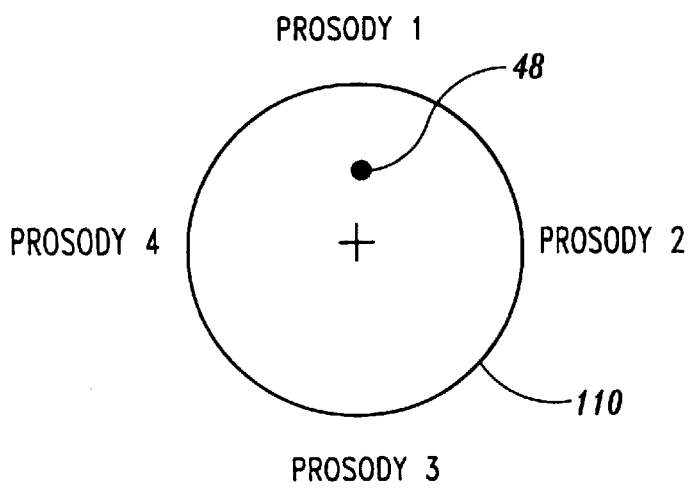
FIG. 13 depicts an alternative embodiment in which user interface element is used to select a prosodic model and intensity of prosody within the prosodic model.

Those skilled in the art should also appreciate that the present invention need not be limited to applications where the user interface mechanism is to select the appearance of a character. A similar mechanism could be utilized to designate prosody of audio output. FIG. 13 depicts an example of a user interface mechanism 110 that may be utilized to specify a given prosody for generated speech. The angular location of the position indicator specifies a tone and the radial location specifies intensity. By positioning the position indicator 48 within the user interface mechanism 110, a user may select a prosody that is appropriate for the user's needs.

The first embodiment assumed that the system maintained a discrete set of bitmaps for the various discrete degrees of intensity of an emotional state. For example, the system may maintain a bitmap for the character being slightly angry, a bitmap for the character being quite angry and a bitmap for the character being very angry. In an alternative embodiment, the system maintains a much larger number of bitmaps that operate as preauthored morphs. Alternatively, each character may be represented as a three-dimensional mesh. Each of these bitmaps/morphs is associated with a point or a small sub-region. Thus, as one moves the position indicator radially, the successive bitmaps/morphs are displayed as the associated points or small sub-regions are crossed and the character appears to change more continually between emotional intensities. It should be appreciated that morphs may be provided for points located between any two adjacent points on the emotion wheel.

While the present invention has been described with reference to a preferred embodiment thereof, those skilled in the art will appreciate the various changes in form and detail may be made without departing from the intended scope of the present invention, as defined in the appended claims. For example, the user interface element may explicitly delineate between adjacent sub-regions by providing visual boundaries and different coordinate systems may be used to identify location of the position indicator.

I claim:

1. In a computer system having an output device, a display device and an input device for positioning a position indicator, a method comprising:

(a) displaying a user interface component that is logically partitioned into at least one sub-region, each sub-region being associated with an emotion and being divided into at least one sub-area, each sub-area including a plurality of points that are associated with an emotional state, wherein
each one of the plurality of points bounded within the sub-area shares the same emotional state;

(b) in response to a selection of any one of the plurality of points bounded within the sub-area, assigning the emotional state associated with the selected point in the sub-area to a graphical character; and (c) generating an output that includes a representation of the emotional state assigned to the graphical character.

2. The method of claim 1, wherein the output device is a video output device for generating a video output that includes the representation of the emotional state of the graphical character, comprising an emotional state-related image of the graphical character that is displayed on the video output device.

3. The method of claim 1, wherein the output device is an audio output device for generating an audio output that represents the emotional state of the graphical character, comprising an emotional state-related sound having a prosody that includes a stress pattern and an intonation pattern.

4. The method of claim 3, wherein each sub-region is associated with a choice of intonation pattern.

5. The method of claim 3, wherein the stress pattern for each sub-area is associated with a choice of stress pattern.

6. The method of claim 5, wherein the sub-region includes a plurality of sub-areas, the plurality of sub-areas being arranged by the choice of each stress pattern that is associated with each sub-area.

7. The method of claim 1, wherein the output device is an audio/video output device for generating an audio output and a video output, the emotional state of the graphical character being illustrated on the audio/video output device by an emotional state related image of the character and the emotional state of the graphical character is further communicated by an emotional state related sound having a prosody that is produced by the audio/video output device.

8. The method of claim 1, wherein each sub-region is associated with a choice of emotion.

9. The method of claim 8, wherein each point in each sub-region is associated with an intensity of emotion.

10. The method of claim 9, wherein the sub-region includes a plurality of sub-areas, the plurality of sub-areas being arranged by the choice of the emotional state associated with each sub-area.

11. The method of claim 1, wherein the user interface component is a symmetrical closed curve.

12. The method of claim 11, wherein the user interface element is circular.

13. The method of claim 1, wherein a size of one sub-region is unequal to another size of another sub-region.

14. The method of claim 1, wherein at least one sub-region includes multiple sub-areas.

15. The method of claim 1, wherein the user interface component is an asymmetrical closed curve.

16. The method of claim 1, wherein the computer system runs an application program.

17. The method of claim 16, wherein the representation of the emotional state of the graphical character is generated by the application program in response to the selection of a sub-region in the user interface component associated with a choice of emotion.

18. The method of claim 17, wherein the representation of the emotional state of the graphical character is generated by the application program in further response to the selection of a sub-area in the user interface component associated with an emotional state.

19. The method of claim 1, wherein the user interface component is used to select an appearance for the graphical character based on the emotional state associated with the selected sub-area.

20. The method of claim 1, wherein each sub-area is associated with at least a portion of the graphical character, each portion of the graphical character illustrating an aspect of the emotional state that is associated with a selected sub-area.

21. The method of claim 20, wherein the portion of the graphical character is a head, the head illustrating the emotional state associated with the selected sub-area.

22. The method of claim 20, wherein the portion of the graphical character is a body, the body illustrating the emotion associated with the sub-region that bounds the selected point in the sub-area.

23. The method of claim 20, wherein the portion of the graphical character is a body extremity, the body extremity illustrating a choice of an intensity of emotion associated with a selected sub-region that bounds the sub-area.

24. The method of claim 1, wherein the representation of the emotional state of the graphical character is displayed in a preview when the sub-region is selected in the user interface component.

25. The method of claim 1, wherein the representation of the emotional state of the graphical character is displayed in a preview when the sub-area is selected in the user interface component.

26. The method of claim 25, further comprising inserting the graphical character in a comic representation that appears on another display when the preview is affirmed.

27. The method of claim 1, further comprising displaying a text message that is associated with the graphical character.

28. The method of claim 27, further comprising assigning a representation of an emotional state to the graphical character that is related to the text message.

29. The method of claim 1, wherein one of the sub-regions has a size that is unequal to another size of another sub-region.

30. The method of claim 29, wherein the one of the sub-regions includes one sub-area that has a size that is unequal to another size of another sub-area in another sub-region.

31. The method of claim 29, wherein one sub-region includes a plurality of sub-areas, at least one of the plurality of sub-areas having a size that is unequal to another size of another sub-area.

32. The method of claim 1, wherein the interface element has a point of origin coordinates and the sub-regions are arranged around the point of origin coordinates, each sub-region having a range of angular coordinates that are relative to the point of origin coordinates, each range of angular coordinates being associated with one of a plurality of emotions.

33. The method of claim 32, wherein each emotion is associated with an image.

34. The method of claim 33, wherein one image is a graphical character's head.

35. The method of claim 33, wherein each sub-area has a range of radial coordinates relative to the point of origin coordinates, each range of radial coordinates being associated with a level of intensity of the emotional state associated with the sub-area.

36. The method of claim 35, wherein each level of intensity of the emotional state associated with the sub-area is associated with a another image.

37. The method of claim 36, wherein the other image is a graphical character's body.

38. The method of claim 37, wherein the representation of the emotional state assigned to the graphical character comprises the image and the other image.

39. The method of claim 35, wherein each sub-region is associated with an emotion position indicator.

40. The method of claim 35, wherein each level of intensity of the emotional state is related to a radial distance from each range of the radial coordinates to the point of origin coordinates.

41. In a computer system having a mouse, a video display and a processor running a program that enables a user to participate in a chat session with a graphical character that represents the user in the chat session, a method comprising:

(a) displaying a graphical element on the video display where the graphical element is logically partitioned into a plurality of sub-regions, each sub-region being divisible into at least one sub-area and being associated with an emotion, each sub-area being associated with an intensity level for an emotion and having an associated range of coordinates that are selected with a cursor positioned by the mouse and bounded by the sub-area, each coordinate in the sub-area being associated with the same emotion and the same intensity level for the emotion; and (b) in response to using the mouse to position the cursor within the range of coordinates bounded within a sub-area, performing an action, including:

(i) determining the sub-region that the cursor lies within from the range of coordinates that is divided into the sub-area; and (ii) assigning an appearance to the graphical character that reflects the emotion associated with the determined sub-region and that reflects the intensity level for the emotion associated with the sub-area that the cursor lies within.

42. The method of claim 41, further comprising displaying the graphical character on the video display with the assigned appearance.

* * * * *

UNITED STATES PATENT AND TRADEMARK OFFICE
CERTIFICATE OF CORRECTION

Page 1 of 2

PATENT NO. : 6,064,383
DATED : May 16, 2000
INVENTOR(S) : T.C. Skelly

It is certified that error appears in the above-identified patent and that said Letters Patent is hereby corrected as shown below:

| COLUMN | LINE | |
|---|---|---|
| 1 | 37 | "to be" should read --via-- |
| 3 | 31 | "a" should be --an-- |
| 3 | 47 | "in which user" should read --in which a user-- |
| 4 | 4 | "irony" should read --irony,-- |
| 6 | 43 | "or" should read --for-- |
| 6 | 49 | "characters" should read --character's-- |
| 6 | 50 | "characters" should read --character's-- |
| 6 | 55 | "characters" should read --character's-- |
| 7 | 57 | "the" should read --that-- |
| 9 (Claim 30, | 45 line 1) | "wherein the one" should read --wherein one-- |
| 9 (Claim 32, | 56 line 4) | "are" should read --is-- |

UNITED STATES PATENT AND TRADEMARK OFFICE
CERTIFICATE OF CORRECTION

PATENT NO. : 6,064,383
DATED : May 16, 2000
INVENTOR(S) : T.C. Skelly

It is certified that error appears in the above-identified patent and that said Letters Patent is hereby corrected as shown below:

COLUMN      LINE

10              13          "with a another image" should read
(Claim 36,      line 3)     --with another image--

Signed and Sealed this

Twenty-second Day of May, 2001

Attest:

NICHOLAS P. GODICI

*Attesting Officer*    Acting Director of the United States Patent and Trademark Office